United States Patent [19]

Ittmann et al.

[11] Patent Number: 4,786,660

[45] Date of Patent: Nov. 22, 1988

[54] METHOD FOR MAKING CURABLE CASTING RESINS

[75] Inventors: Guenther Ittmann, Gross-Umstadt; Manfred Krieg, Darmstadt, both of Fed. Rep. of Germany

[73] Assignee: Röhm GmbH, Darmstadt, Fed. Rep. of Germany

[21] Appl. No.: 902,937

[22] Filed: Sep. 2, 1986

[30] Foreign Application Priority Data

Sep. 7, 1985 [DE] Fed. Rep. of Germany ....... 3531914

[51] Int. Cl.$^4$ ................................................ C08K 5/24
[52] U.S. Cl. .................................... 524/265; 524/853; 524/264; 525/10; 525/293; 525/455; 525/514; 525/530; 427/385.5; 428/220; 428/331
[58] Field of Search ............... 524/265, 264, 853; 525/10, 293, 455, 514, 530; 427/385.5; 428/36, 220, 310, 331

[56] References Cited

U.S. PATENT DOCUMENTS

| 3,644,255 | 2/1972 | Thompson | 524/265 |
|---|---|---|---|
| 4,221,697 | 9/1980 | Osborn et al. | 525/293 |
| 4,251,576 | 2/1981 | Osborn et al. | 428/36 |
| 4,292,236 | 9/1981 | Ibsen et al. | 524/265 |

FOREIGN PATENT DOCUMENTS

| 0073064 | 3/1983 | European Pat. Off. | 524/265 |
|---|---|---|---|
| 107764 | 9/1983 | European Pat. Off. | |
| 3331371 | 8/1983 | Fed. Rep. of Germany | |
| 3331371 | 4/1984 | Fed. Rep. of Germany | |
| 3323951 | 1/1985 | Fed. Rep. of Germany | |
| 2503168 | 10/1982 | France | |
| 50-51131 | 5/1975 | Japan | 524/265 |
| 60-221450 | 11/1985 | Japan | 524/265 |
| 1493393 | 11/1977 | United Kingdom | |
| 2083481 | 3/1982 | United Kingdom | 524/265 |
| 2099000 | 12/1982 | United Kingdom | |

Primary Examiner—Joseph L. Schofer
Assistant Examiner—N. Sarofim
Attorney, Agent, or Firm—Curtis, Morris & Safford

[57] ABSTRACT

A method for making curable casting resins having a high content of finely divided inorganic fillers and comprising esters of acrylic or methacrylic acid and organosilicon compounds used as adhesion promoters, which method involves mixing the liquid polymer precursor comprising acrylic or methacrylic esters with the organosilicon compound and with an alkylamine as a catalyst for the organosilicon compound, the finely divided inorganic fillers being incorporated into the resulting mixture in such amounts that the viscosity of the mixture does not exceed 10 Pa.sec, the resulting thixotropic suspension then being transformed into a completely deflocculated low viscosity suspension by being allowed to stand for a sufficient length of time at room temperature or by short term heating.

11 Claims, No Drawings

METHOD FOR MAKING CURABLE CASTING RESINS

The present invention relates to a method for making low viscosity casting resins which contain a high content of finely divided fillers and which can be cured conventionally, for example by the addition of an appropriate initiator, both with and without the use of pressure.

The prior art

The term "casting resin" is generally applied to synthetic resins which are liquid or can be liquefied by moderate heating and poured into molds.

German Patent 2,449,656 and corresponding U.S. Pat. Nos. 4,221,697 and 4,251,576 teach stable, liquid or liquefiable, moldable, and curable masses composed of a polymerizable organic liquid and particulate inorganic fillers, which masses are obtained by dispersing a filler (B) in a component (A) in the presence of a dispersing agent (C) and optionally in the presence of a binder (D), (A), (B), (C), and (D) having the following meanings:

(A) A liquid organic precursor having a viscosity at the molding temperature of the curable mass of not more than 5.0 Pa.sec and composed of (A) (1) a liquid monomer or monomer mixture capable of forming a solid polymer by polymerization or polyaddition, in which polymer the repeating units in the polymer chain are linked by carbon-carbon bonds or by carbon-carbon bonds interrupted by the hetero atoms O, N, or Si; or of (A) (2) a mixture of one or more preformed polymers with one or more monomers, the monomeric component of which is capable of forming a solid polymer by polymerization or polyaddition; or of (A) (3) a partially polymerized material or a prepolymer capable of forming a solid polymer by polymerization or polyaddition;

(B) From 20 to 90 volume percent of a finely divided inorganic filler having a modulus of elasticity in shear of at least 5 G $Nm^{-2}$ and a maximum particle size of 100 microns, with at least 95 percent of the particles having a size of not over 10 microns and with not more than 10 percent of the particles having a size less than 0.1 micron;

(C) Not less than 0.01 $g.m^{-2}$, based on the total surface of the particles of component (B), of a polymeric dispersing agent having at least one polymer chain with a molecular weight of at least 500 which contains one or more anchoring groups capable of association with the filler (B), subject to the condition (a) that the polymer chain be selected so that it is solvatable by the liquid polymerizable component (A) to the extent that it, as an independent molecule, has significantly better solubility in component (A) than in a theta solvent; (b) that the polymeric dispersing agent be compatible with the product of polymerization of component (A); and (c) that it optionally contain functional groups capable of grafting or copolymerization with the monomers present in component (A) during the cure;

(D) A low molecular weight binder having one or more groups capable of interaction with the groups present in component (B) and having one or more groups capable of being copolymerized or grafted with the polymer formed by polymerization of the liquid precursor (A).

In published German Patent Application DOS No. 33 31 371, casting resins comprising acrylic esters with a high content of finely dispersed fillers are proposed. These casting resins contain a mixture of organosilicon compounds with functional groups and metallic acid esters of metals of subgroups IV and V of the Periodic Table. The functional group of the organosilicon compound is ethylenically unsaturated and linked to the silicon atom either directly or through alkylene groups, and may be present once or repeatedly in the molecule. The addition of this mixture to conventional casting resins produces a desired lowering of the viscosity of these resins, which are used in the manufacture of sanitary ware, for example.

The object

Low viscosity casting resins containing a high content of finely divided fillers are desired. These fillers can contribute to increased flexural strength and impact resistance of the molded articles manufactured from the casting resins. High filler loadings are also desirable because they reduce the polymerization shrinkage which occurs during the cure of the casting resin, and in addition they shorten the curing times.

In the manufacture of the molded articles, a low viscosity of the casting resins is advantageous, of course, since it permits the molds to be filled accurately and completely. However, the prior art solutions have not proved satisfactory in every respect. One of the main problems in the production of low viscosity casting resins with high filler loadings is the introduction of the inorganic filler into the organic phase, unsaturated because of the monomer content. Mineral fillers such as cristobalite, quartz powder, and the like, cannot be added to the monomer mixture directly in amounts ranging from 60 to 80 weight percent since they inevitably result in a friable mass that does not lend itself to pouring into a mold. To obtain good mechanical properties, a chemical bond must be established between the inorganic and organic phases. This bond can be created conventionally with organosilicon compounds.

According to published German Patent Application DOS No. 24 29 656 and the aforementioned corresponding U.S. patents, the introduction of the inorganic component into the organic phase is accomplished using polymeric dispersing agents. The teaching of that publication relates to relatively complex systems in which the polymeric dispersing agent and the other components must be coordinated with one another. What was desired was obtaining with reasonable ease stable dispersions of the fillers, largely regardless of their mature.

This same published German patent application and its U.S. counterparts report on experimental results obtained omitting the polymeric dispersing agent altogether or replacing it with a conventional dispersing agent. For example, quartz-silica was incorporated into a mixture of methyl methacrylate and gamma-methacryloyloxypropyl trimethoxysilane using shearing action. A very viscous, flocculent mixture which could not be poured was obtained. The mixture was compression-molded and cured, which yielded a cracked, flawed, sheet material.

Published German Patent Application DOS No. 33 31 371 proposes the use of organosilicon compounds together with acid esters of metals of subgroups IV and V of the Periodic Table. The last-mentioned patent publication also points out that the viscosity problem in the case of casting resins with high filler loadings cannot be solved by the addition of organosilicon compounds. In fact, some organosilicon compounds reportedly produced a further increase in viscosity. Apparently an appropriate consistency is obtainable only by the addition of the acid esters or organic complex esters of the metals of subgroup IV or subgroup V of the Periodic Table.

There continued to be a need for casting resins with high loadings that could be prepared with greater ease and at lower cost than those of the prior art.

To provide for technically satisfactory removal of the castings from the molds, it is often advisable to add conventional release agents.

Suitable release agents include metallic soaps such as metal stearates, silicones, polymers such as polyamides and polyethylenes, and talc, mica, and the like.

The Invention

It has been found that the method of the invention for preparing casting resins comprising acrylic acid esters or methacrylic esters and containing from 50 to 80 percent by weight of finely divided inorganic fillers using organosilicon compounds as adhesion promoters is well suited for accomplishing the aforementioned objects.

No acid esters of metals of subgroups IV and V of the Periodic Table are used in the preparation of these casting resins, nor are any polymeric functional dispersing agents added.

In the process of the invention, the curable polymer precursor comprising acrylate or methacrylate esters is mixed with the organosilicon compound and with an alkylamine catalyst for the organosilicon compound, and finely divided inorganic fillers are incorporated into that mixture in such amounts that the viscosity of the mixture does not rise above 10 Pa.sec (as determined by means of a rotating cylinder viscosimeter according to DIN 53019, Part 1, at 20° C.), preferably by the use of shearing forces, the thixotropic suspension initially formed then being transformed into a completely deflocculated, low viscosity suspension by being allowed to stand at room temperature or by short term heating.

According to DIN 53019, the fluid to be tested is placed in an annulus between two coaxial cylinders, one of which (the rotor) rotates at a constant speed while the other (the stator) remains at rest. The speed and the torque required to overcome the viscous resistance of the fluid in the annulus are determined. The shear stress and the rate of shear in the fluid can be calculated from the geometric configuration and dimensions of this system and the values measured for torque and speed.

First, the torque readings from the instrument scale and the corresponding values of the speed n should be plotted in a linear coordinate system. A smoothed curve shall be drawn which fits the points. Afterwards pair of value for torque and rotational frequency shall be read off from this curve and converted to the corresponding values of shear and rate of shear. Either following equations (4) or (8) can be used to calculate shear stress and equations (7), (9) or (10) can be used for the rate of shear D.

$$\tau = \frac{1 + \delta^2}{2\delta^2} \times \frac{M}{2\pi L R_i^2 c_L} \quad (4)$$

$$\tau = 0.0446 \times \frac{M}{R_i^3} \quad (8)$$

-continued $$D = \Omega \frac{1 + \delta^2}{\delta^2 - 1} \quad (7)$$

$$D = 12.33 \cdot \Omega \quad (9)$$

$$D = 1.29 \ln, \text{ where} \quad (10)$$

$\delta$ is the ratio of the radius of the outer cylinder to that of the inner cylinder, L is the length of the inner cylinder, $R_i$ is the radius of the inner cylinder, M is torque, calculated from the scale reading multipled by an instrument factor (e.g. expressed in N.m per scale unit), $c_L$ is the drag coefficient of the cylinder face correction (face factor) as specified in DIN 53018 Part 2) where $c_L = 1.10$, empirically determined for Newtonian fluids and a firsst approximation for non-Newtonian fluids in a preferred apparatus, and $\Omega = D.1047n$ if n is expressed in min$^{-1}$ and $\Omega$ is in s$^{-1}$.

Plotting these pairs of quantities gives desired flow curve $D = f(\tau)$.

If this flow curve is a straight line passing through the origin, the viscosity can be expressed by a single value corresponding to the slope, i.e. the quotient $\eta = \tau/D$ of any pair $(\tau, D)$. If the flow curve is non-linear, correlated values of $\tau$ and D can be read off and the quotient $\tau/D$ shall be plotted against $\tau$ or D as a shear stress or shear rate dependent viscosity.

According to the International System of Units (IS) the unit of dynamic viscosity is the pascal second (Pa.s).

The casting resins prepared in accordance with the invention can be used to produce a wide variety of molded articles, and especially sanitary fixtures such as sinks, wash basins, etc. By and large, they show promise as substitutes for ceramic materials, whose production is relatively energy intensive.

The polymer precursors

Monomers or mixtures of monomers, preferably with the addition of prepolymers, capable of being polymerized with the aid of free radicals to give a polymer that is solid at room temperature are suitable for use as liquid starting materials for the polymer.

In this respect, the invention makes use of the teachings of the prior art (for example, the precursors of published German patent application DOS No. 24 49 656). As a rule, the liquid starting materials for the polymer have a viscosity of not over 5 Pa.sec, and preferably not over 0.1 Pa.sec, at the molding temperature.

Suitable monomers include vinylic monomers or vinylidene monomers (see Ullmanns Enzyklopäadie der Technischen Chemie, 3rd ed., Vol. 14, pp. 108–110, Urban & Schwarzenberg, 1963), for example, vinyl esters and ethers, acidic vinyl compounds, vinylic carbonyl compounds, vinyl aromatics and heterocyclic vinyl compounds, olefins, halogenated olefins, and particularly derivatives of acrylic acid and of methacrylic acid. In the latter case, monomers of the formula

wherein R is hydrogen or methyl and $R_1$ is linear or branched, unsubstituted or substituted alkyl having from 1 to 18 carbon atoms or unsubstituted or substituted aryl having from 6 to 10 carbon atoms, are preferred. Illustrative of suitable substituents are conventional substituents such as halogen, hydroxy, alkoxy, and dialkylamino substituents with $C_1$ to $C_{17}$ alkyl, and preferably $C_1$ to $C_6$ alkyl.

Particularly well suited monomers are compounds of formula (I) wherein $R_1$ represents alkyl having from 1 to 8 carbon atoms, and especially ethyl acrylate and methacrylate, propyl acrylate and methacrylate, butyl acrylate and methacrylate with the isomers, 2-ethylhexyl acrylate and methacrylate, phenyl acrylate and methacrylate, benzyl acrylate and methacrylate, and particularly methyl methacrylate. Moreover, the liquid starting materials may further contain conventional crosslinkable monomers, such as those carrying at least two polymerizable vinyl groups in the molecule. (Cf. H. Rauch-Puntigam & Th. Völker, "Acryl- and und Methacrylverbindungen", p. 184, Springer Verlag, 1967). Illustrative of these are, for example, ethylene glycol dimethacrylate, 1,4-butanediol dimethacrylate, triglycol dimethacrylate or trimethylolpropane trimethacrylate, and allyl compounds such as allyl methacrylate, triallyl cyanurate, and allyl diglycol carbonate. The crosslinker content generally ranges from 0.01 to 10 percent and preferably is between 0.1 and 5 percent by weight of the liquid polymer precursors. The methyl methacrylate content is preferably over 50 percent and, more particularly, between 80 and 100 percent, by weight of the liquid polymer precursor.

Moreover, monomers which are copolymerizable with acrylic and methacrylic esters may be used as comonomers. These include the aforesaid vinyl aromatics and heterocyclic vinyl compounds, for example styrene, methylstyrenes such as alpha-methylstyrene, and divinylbenzene, vinylpyrrolidone, vinylpyridine, acrylonitrile and methacrylonitrile, vinyl esters such as vinyl acetate and propionate, vinyl chloride, and vinylidene chloride. As a rule, derivatives of acrylic acid and of methacrylic acid, and particularly the esters of formula (I) and of the crosslinking monomers, preponderate (i.e. are over 50 weight percent). They may advantageously be as much as 100 weight percent of the starting material for the polymer. Particularly advantageous is a mixture of methyl methacrylate and a crosslinking monomer such as glycol dimethacrylate wherein the weight ratio may advantageously be as high as 100:2.

The liquid polymer precursor is advantageously composed of the monomers described, preferably with the addition of prepolymers. The prepolymers are usually composed of the same types of monomers as the monomers discussed above but do not contain any functionalized monomers. As a rule, the proportions given above for the monomers apply here, too. The monomeric constituents of the prepolymers may be the same as or different from the above monomers. The prepolymers are preferably dissolved in the monomers; however, they may also be dispersed therein. The prepolymers generally have molecular weights ranging from $2(10^4)$ to $4(10^5)$, as determined by gel permeation chromatography. The prepolymers represent from 0 to 20 weight percent of the liquid polymer precursors, and preferably from 0 to 10 weight percent. A prepolymer of methyl methacrylate and methyl acrylate in a weight ratio of 9:1 with a reduced viscosity of 110 ml/g will serve as an example.

The fillers

Suitable fillers are the finely divided inorganic materials commonly used for casting resins. A particle diameter of 100 microns, and preferably of 50 microns, should not be exceeded. Preferably, at least 95 percent of the particles are not over 10 microns. Whenever possible, particles of a size less than 1 micron should not make up more than 10 percent of the total number of particles. Particle size is determined by the usual methods. (Cf. B. Scarlett, "Filtration and Separation", p. 215, 1965). The particle size determination should be based on the largest dimension of the particles. Particles of granular shape are preferred. Occasionaly it may be advantageous to free the articles from adsorptively bound moisture by heating to about 150° C.

The fillers may be natural or synthetic products. Mechanical properties, such as hardness and modulus of elasticity, should be as required by the intended end use of the casting resins. Formulation for a modulus of elasticity in shear of at least 5 G $Nm^{-2}$ may be advantageous. For example, minerals such as alumina and its derivatives, for example alkali metal and alkaline earth metal double oxides, clays, silica in its various modifications, silicates, aluminosilicates, carbonates, phosphates, sulfates, sulfides, oxides, carbon, metals, and metal alloys are suitable. Synthetic materials such as glass powder, ceramics, porcelain, cinder, and finely divided synthetic $SiO_2$ are also suitable. Included are silicic acid modifications such as quartz (quartz powder), tridymite and cristobalite, kaolin, talc, mica, feldspar, apatite, barytes, gypsum, chalk, limestone and dolomite. Optionally, mixtures of fillers may also be used. Fillers should represent at least 20 weight percent of the casting resins of the present invention. As a rule, a filler loading of 80 weight percent should not be exceeded. A filler content of the casting resins of from 50 to 80 weight percent will serve as a guide. The filler may be reduced to the appropriate particle size by conventional methods, such as crushing and grinding. Cristobalite is particularly preferred.

The organosilicon component

The organosilicon component serves in known fashion as an adhesion promoter between filler and organic phase. The organosilicon compounds known from the prior art may therefore be used. When the organosilicon compounds in accordance with the present invention are employed, no use is made of acid esters of metals of subgroup IV or subgroup V of the Periodic Table.

Primarily, functional organosilicon compounds with at least one ethylenically unsaturated group in the molecule are suitable for use. The functional group carrying the ethylenically unsaturated group is usually linked through a carbon atom to the central silicon atom. The remaining ligands on the silicon usually are alkoxy having from 1 to 6 carbon atoms, and there may also be ether bridges in the alkyl. Examples are the vinyl trialkoxysilanes. The carbon-carbon double bond may also be linked through one or more carbon atoms to the silicon atom, for example as in the form of the allyl trialkoxysilanes or the gamma-methacryloyloxypropyl trialkoxysilanes. Dialkoxysilanes may also be used, a further functional group with a carbon-carbon double bond, usually of the same type, or any alkyl having preferably from 1 to 6 carbon atoms then being attached to the silicon atom. Different types of organosilicon compounds may also be present in the organosilicon component.

Example are vinyl trimethoxysilane, vinyl triethoxysilane, vinyl triacetoxysilane, vinyl tris(methoxyethoxy)silane, divinyl dimethoxysilane, vinyl methyldimethoxysilane, vinyl trichlorosilane, gamma-methacryloyloxypropyl trimethoxysilane, and gamma-methacryloyloxypropyl tris(methoxyethoxy)silane.

The organosilicon compounds are advantageously used together with catalysts of the amine type, and particularly of the alkylamine type having from 3 to 6 carbon atoms, and especially with n-butylamine. From 0.25 to 5 percent, and preferably from 1 to 3 percent, by weight of the organosilicon component, will serve as a guide for the use of the amine catalyst.

As a rule, the weight ratio of inorganic fillers to organosilcon compounds will range from 500:1 to 20:1 and preferably is 50±25:1.

The process for the preparation of curable casting resins

First the liquid polymer precursor comprising acrylic acid esters or methacrylic acid esters is mixed with the organosilicon compound or compounds and the alkylamine catalyst. The finely divided inorganic fillers are then added to this mixture and mechanically dispersed therein, preferably by the use of shearing forces, in such amounts that the viscosity does not rise above about 10 Pa.sec.

Preferably this is done by first introducing about 60 to 70 weight percent of the inorganic fillers. The mix then is initially pasty to viscous. After a while the viscosity will drop, and more inorganic filler can be added. The incorporation of the fillers will usually be completed after about 1 to 2 hours.

The preparation of the curable casting resin in the fluid consistency required for use can be concluded by agitation at room temperature for a sufficient length of time, for example 24 hours.

Alternatively, the mixture may also be treated thermally after addition of the fillers. The temperature range from 60° C. to 100° C. has proved satisfactory. In practice, the high viscosity dispersion is heated to the proper temperature and then immediately cooled. A suitable means for mechanically dispersing the fillers is a dissolver, for example.

After the fillers have been incorporated, the mixture can be agitated on a roller train, for example.

Use of casting resins

For the production of castings, commonly used free radical accelerators are added in the usual quantities. These include peresters such as peroxydicarbonates, and particularly bis(4-tert-butylcyclohexyl)peroxydicarbonate, in amounts of from 1 to 5 percent, by weight of the monomers. It is advisable to add the accelerators only just before the resins are poured into the molds and cured.

In addition to the finely divided fillers, reinforcements of the fibrous type, for example, may be added to the liquid casting resins of the invention. Suitable fibers are glass fibers, mineral fibers, and ceramic fibers, for example. The amount of these reinforcements is generally less than the content of finely divided fillers.

To be able to produce colored castings, pigments and/or dyes may further be added to the organic phase. An example is the use of iron oxide, titanium oxide, zinc white, ultramarine blue, or carbon black.

Production of castings

The curable liquid casting resin mixed with the accelerator can readily be poured into the conventional molds. The mold is advantageously evacuated before it is filled. Curing is preferably carried out thermally, for example by heating to from 50° C. to 60° C. for from 20 to 60 minutes, advantageously in a forced draft oven. Curing may be carried out with or without the use of pressure.

A wide variety of molds can be filled and technically satisfactory polymerization carried out by means of the casting method in accordance with the invention. Dishes, bowls, wash basins, sinks, toilet bowls, molded articles for the construction industry, machine foundations, tanks, etc., can be produced in this way. The advantages of this manufacturing method are: A great variety of shapes (even relatively complex shapes can be produced); low energy requirements; low labor requirement; a high degree of reliability; and minimal reworking time. Moreover, the casting resins of the invention are fairly easy to prepare and are ecologically innocuous.

The castings made from them are distinguished by a flawless surface, high rigidity, and high strength.

Properties of casting resins

At the conclusion of the process in accordance with the invention, the casting resins have a viscosity (in conformity with DIN 53211, 6 mm cup diameter) ranging from 10 to 40 sec.

Test specimens taken from cast sheets were used to determine the mechanical properties.

In the case of casting resins comprising methyl methacrylate/glycol dimethacrylate in a weight ratio of about 50:1, the flexural strength (in conformity with DIN 35452) was found to be between 133 and 120 N/mm$^2$, and the impact strength (in conformity with DIN 53453) at least 5 kJ/m$^2$.

The examples which follow will serve to illustrate the invention. Determination of reduced viscosity is carried out in chloroform at 20° C. in an Ubbelohde microviscosimeter. (Cf. Houben-Weyl, Methoden der organischen Chemie, Vol. 14/1, pp. 81–84, Georg Thieme Verlag, 1961).

EXAMPLE 1

Preparation of casting resin 104 g of methyl methacrylate are mixed homogeneously with 2 g of ethylene glycol dimethacrylate and 8 g of gamma-methacryloyloxypropyl trimethoxysilane with the addition of 0.2 g of n-butylamine.

280 g of cristobalite (Cristobalite T 6000, particle-size range 0.1 to 10 microns, product of Quarzwerke, Cologne) is then admixed in portions with that mixture by the use of a dissolver (UMA-Dissolver, VMA Getzmann, Verfahrenstechnik Heienbach, Reichshof, West Germany) in such a way that the viscosity of the mixture does not exceed 10 Pa.sec. This is done over a period of about 1 hour, during which the reaction is allowed to proceed at intervals without agitation, especially toward the end.

The batch is then agitated for 24 hours on a roller train. Then 6 g of a copolymer of methyl methacrylate and methyl acrylate (90:10 parts by weight) having a reduced viscosity of 110 ml/g (product PLEX 8 640 F of Röhm GmbH) is added. The viscosity (in conformity with DIN 53211, 6 mm cup diameter) is 24 sec.

EXAMPLE 2

Production of a casting 0.6 part by weight of bis(4-tert.-butylcyclohexyl)-peroxydicarbonate is stirred into the casting resin of Example 1 as an initiator. This is followed by evacuation. The mixture is then used to cast sheets measuring 200×200 ×4 mm. Hardening is carried out at 80° C. for about 25 minutes. Standard samples 50×6×4 are then cut from the sheets for determination of the flexural strength.

Determined were: Flexural strength in conformity with DIN 53452: 133 N/mm² Impact resistance in conformity with DIN 53453: 6.0 kJ/m².

EXAMPLE 3

Preparation of a casting resin 129.75 g of methyl methacrylate are homogeneously mixed with 2.5 g of ethylene glycol dimethacrylate and 10 g of gamma-methacryloyloxypropyl trimethoxysilane with the addition of 0.25 g of n-butylamine. 350 g of cristobalite (see Example 1) are then introduced into this mixture in portions, using a dissolver, in such a way that the viscosity of the mixture does not exceed 10 Pa.sec. This is done over a period of 70 minutes. The mixture is then allowed to react for one-half hour, following which 0.1 g of 2,4-dimethyl-6-tert.-butylphenol is added as stabilizer.

The batch is then heated within 30 minutes to 95° C. and then allowed to cool for about 1 hour. The mixture has a viscosity (in conformity with DIN 53211, 6 mm cup diameter) of 8.5 sec. 5.0 g of a copolymer of methyl methacrylate and methyl acrylate (9:1 parts by weight) with a reduced viscosity of 110 ml/g are then added. A completely deflocculated casting resin having a viscosity (in conformity with DIN 53211, 6 mm cup diameter) of 30 sec is obtained.

A casting is then produced as in Example 2.

The mechanical properties are the same as in Example 2.

What is claimed is:

1. A method for making a low-viscosity liquid suspension, adaptable to use as a casting resin and curable in the presence of an agent generating free radicals, said suspension containing a high content of finely divided inorganic filler but being free of any polymeric functional dispersing agent, which method comprises mixing a liquid polymer precursor, an organosilicon compound as an adhesion promotor, and an alkylamine as a catalyst for the organosilicon compound, incorporating finely divided inorganic fillers into the resulting mixture in such an amount that the viscosity of the resulting thixotropic suspension (as determined by means of a rotating cylinder viscosimeter in conformity with DIN 53019, Part 1, at 20° C.) does not exceed 10 Pa.sec, and then converting said thixotropic suspension into a completely deflocculated low-viscosity suspension by letting it stand at room temperature for a sufficient length of time or by heating it for a short time, said liquid polymer precursor consisting essentially of a monomer or monomer mixture or of a mixture of a prepolymer, free of functional groups, dissolved or dispersed in a monomer or monomer mixture.

2. A method as in claim 1 wherein said liquid polymer precursor comprises over 50 percent by weight of methyl methacrylate.

3. A method as in claim 1 wherein said liquid polymer precursor contains from 0.01 to 10 percent by weight of a crosslinking agent.

4. A method as in claim 1 wherein said organosilicon compound comprises gamma-methacryloyloxypropyl trialkoxysilane.

5. A method as in claim 1 wherein said finely divided inorganic filler is from 50 to 80 weight percent of the casting resin.

6. A method as in claim 1 wherein the weight ratio of inorganic filler to organosilicon compound is from 500:1 to 20:1.

7. A method as in claim 1 wherein said alkylamine catalyst is used in an amount from 0.25 to 5 percent by weight of the organosilicon compound.

8. A method as in claim 1 wherein said finely divided inorganic filler is incorporated over a period of 1 to 2 hours.

9. A method as in claim 1 wherein, after the inorganic fillers have been incorporated, the resulting thixotropic suspension is heated at 60° C. to 100° C.

10. A method as in claim 1 wherein, after the inorganic fillers have been incorporated, the resulting thixotropic suspension is allowed to react for at least 24 hours at room temperature.

11. A method as in claim 1 wherein the completely deflocculated low viscosity suspension has a viscosity of not over 500 mPa.sec.

* * * * *